July 28, 1964 G. SMITH 3,142,810
POSITION MEASURING DEVICE
Filed July 8, 1960 4 Sheets-Sheet 4

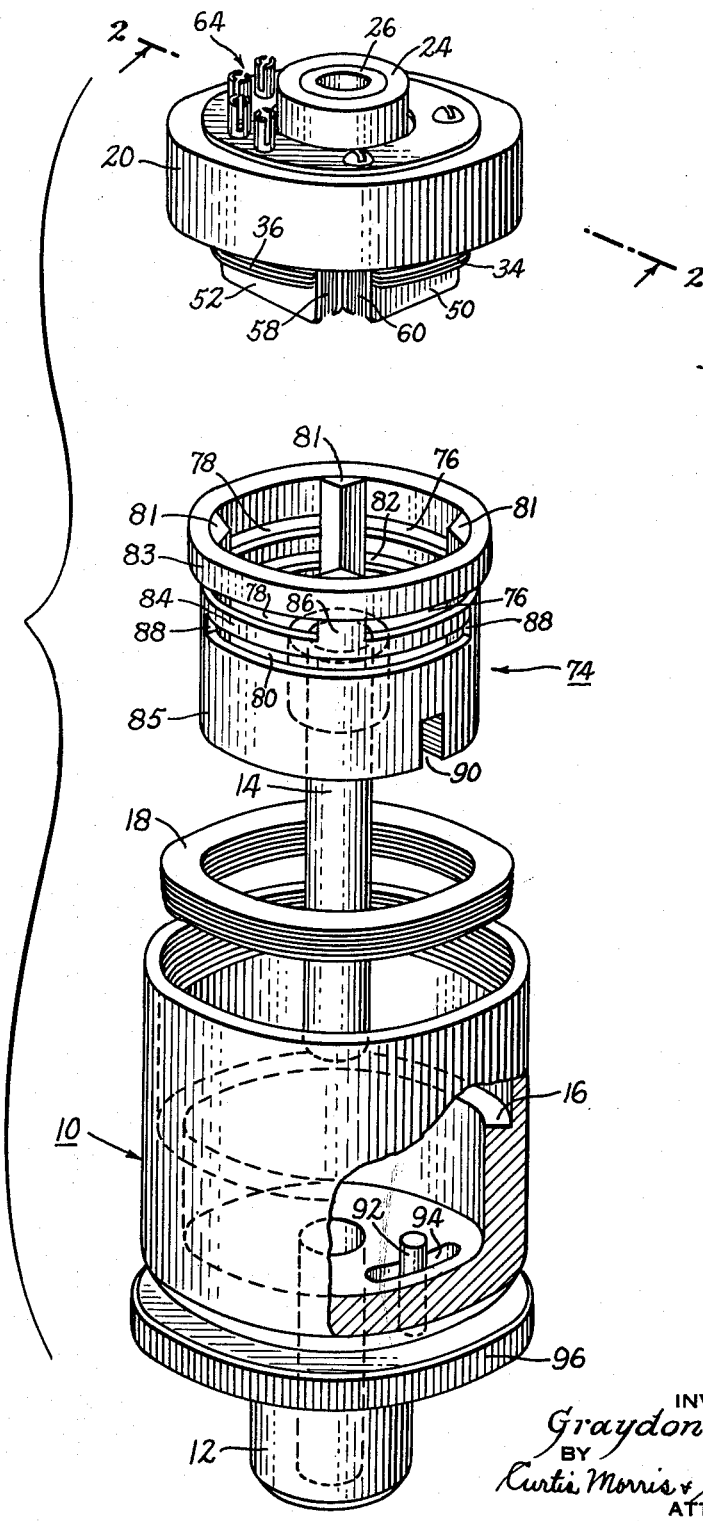

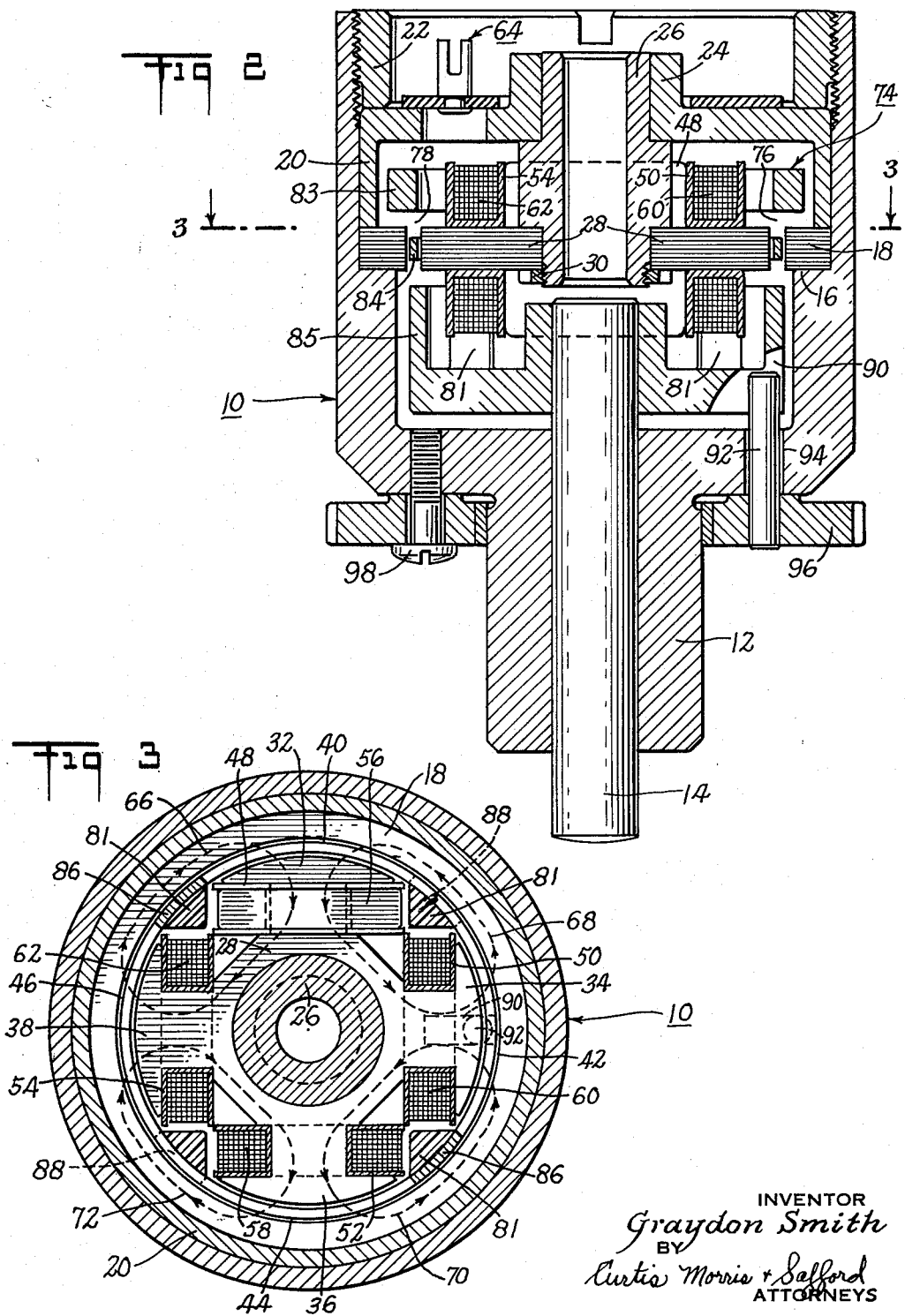

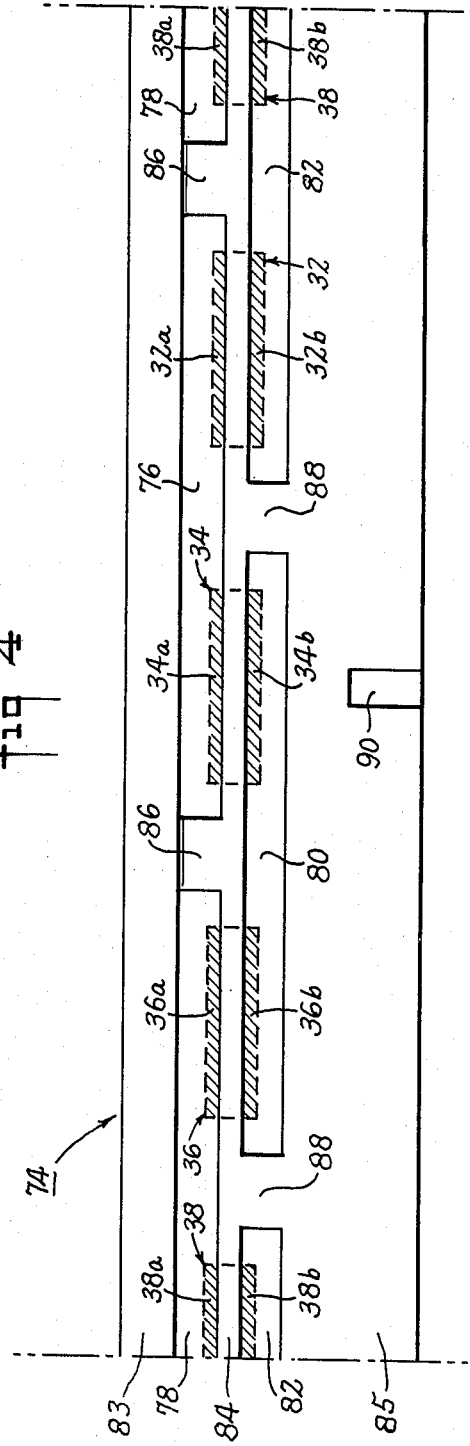
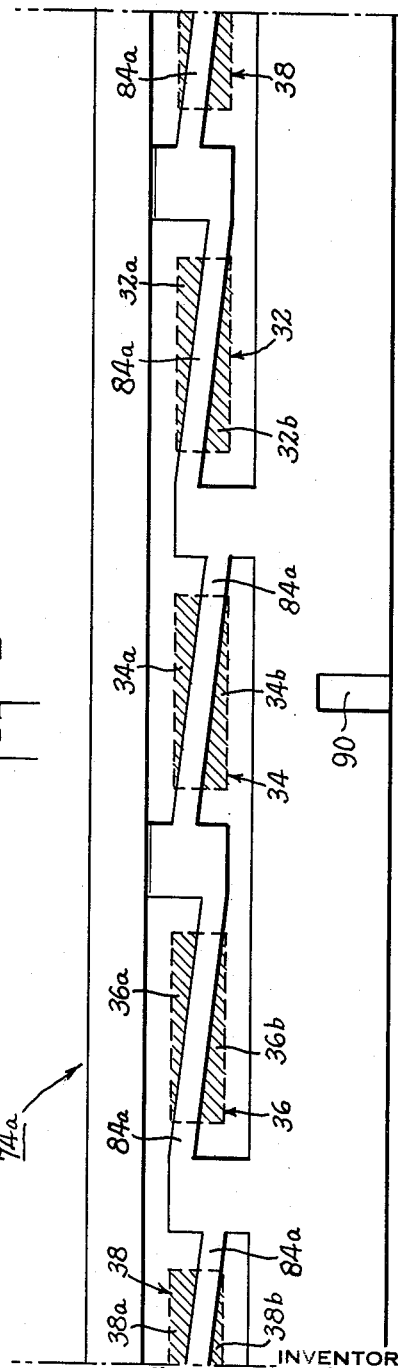

INVENTOR
Graydon Smith
BY
Curtis Morris & Safford
ATTORNEYS

United States Patent Office 3,142,810
Patented July 28, 1964

3,142,810
POSITION MEASURING DEVICE
Graydon Smith, Concord, Mass., assignor to
Clevite Corporation, Cleveland, Ohio
Filed July 8, 1960, Ser. No. 41,688
23 Claims. (Cl. 336—75)

This invention relates to position measuring apparatus. More in particular, this invention relates to improved apparatus of the kind that is adapted to produce an electrical output signal the magnitude of which varies in accordance with changes in the positioning of a movable member. An example of prior apparatus of the general type to which the present invention is directed is shown in U.S. Patent 2,631,272.

Devices of this type comprise a magnetic core structure arranged to form two closed magnetic circuits. Magnetic flux is produced in these circuits by one or more primary windings, and a movable "flux-barrier" is mounted in an air-gap in the core to control the relative magnitudes of flux in the two circuits. The position of the flux-barrier (and hence the position of any input member connected thereto) is indicated by the magnitude of an electrical output voltage developed by secondary winding means which are coupled to the magnetic structure in such a way that the output voltage is controlled by the flux in both magnetic circuits.

Conventionally, the magnetic core structure comprises parallel top and bottom members joined by three legs consisting of a center leg and two outer legs. The center leg carries a primary winding to produce flux in the two magnetic circuits which are defined by the two outer legs, adjacent portions of the top and bottom core members, and the center leg which is common to both magnetic circuits. The two outer legs carry respective identical secondary windings connected in series-opposition to develop an output voltage responsive to the difference in flux in the outer legs.

The air-gap for the flux-barrier typically is placed in the center leg, immediately adjacent the bottom member of the core. The flux-barrier for such a core construction normally consists of an electrically-conductive square-shaped ring surrounding the bottom core member, with one side element thereof (sometimes referred to as the "cross-piece") extending across the air-gap in a direction perpendicular to the effective plane of the magnetic core, i.e. in this case the plane defined by the longitudinal axes of the top and bottom core members.

The flux-barrier is mounted for movement through the air-gap in a lateral direction, that is, movement parallel to the axis of the bottom core member, and hence parallel to the effective plane of the core. Such movement of the flux-barrier varies the relative distribution of the flux between the two outer legs, and therefore alters the output voltage developed by the secondary windings. When the flux-barrier is positioned in the center of the air-gap so that the flux produced by the primary winding is evenly divided between the two outer legs, the individual secondary voltages will cancel to produce a "null" or zero output. As the flux-barrier is moved away from this position, the flux passing through the secondary windings is correspondingly unbalanced, and thus the net voltage produced by the secondary windings will have a value directly related to the position of the flux-barrier.

Devices of this type have proven to be well adapted for making position measurements in a wide variety of industrial applications, particularly because of the stability and positional linearity of the output signal produced thereby. However, it has been found desirable for many applications to provide a device of this type having greater sensitivity than heretofore available, but which nevertheless is relatively small in overall size. The present invention is directed to solving this and related problems.

Accordingly, it is an object of this invention to provide position measuring apparatus that is superior to that provided heretofore. It is a further object of this invention to provide such apparatus that has high sensitivity and yet is relatively compact. Another object of this invention is to provide such apparatus that is reliable in operation and inexpensive to construct. Other objects, aspects and advantages of the present invention will in part be pointed out in, and in part apparent from, the following description considered together with the accompanying drawings, in which:

FIGURE 1 is an exploded perspective view, partly broken away, of a position measuring device constructed in accordance with the present invention;

FIGURE 2 is a vertical section through the (assembled) device of FIGURE 1;

FIGURE 3 is a horizontal section taken along line 3—3 of FIGURE 2;

FIGURE 4 is a developed view of the movable armature which serves as the flux-barrier;

FIGURE 5 is a developed view of a modified armature construction;

Figure 6:
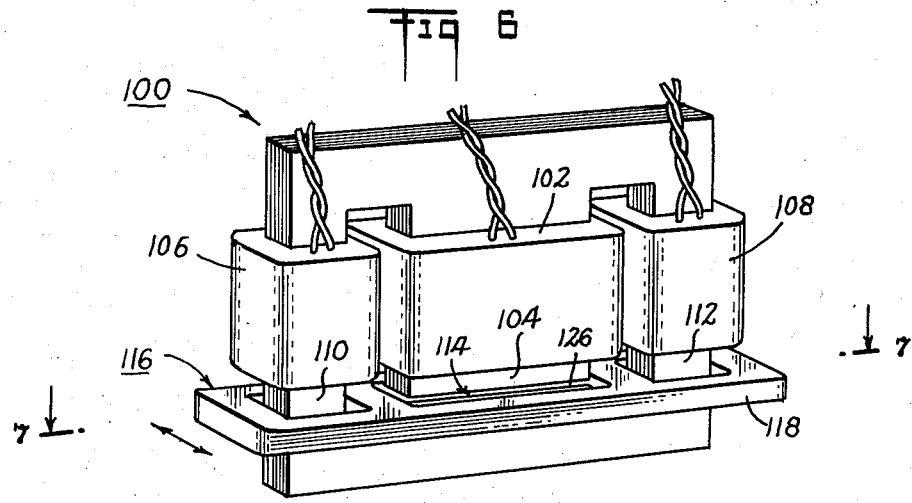
FIGURE 6 is a perspective view of another position measuring device.

Referring now to FIGURES 1 and 2, the measuring device includes a cylindrical outer casing, generally indicated at 10, which is provided on its lower end with a protruding boss 12. This boss is concentrically bored to receive a shaft 14 mounted for sliding movement therein. In normal use of the instrument, the lower end of this shaft will be connected to a member (not shown) the positioning of which it is desired to measure, and the shaft will move up or down axially in response to changes in positioning of this member.

The casing 10 is formed circumferentially on its interior with a flat shoulder 16 adapted to receive and support a ring-shaped magnetic core 18 (referred to herein as the outer core). This core is pressed lightly against shoulder 16 by a cup-shaped frame member 20 which, in turn, is secured within casing 10 by an externally threaded ring 22.

The frame member 20 is provided with an upstanding central hub 24 which is concentrically bored to receive a downwardly extending core support member 26 secured thereto, as by means of a press fit. This support member carries at its lower end an inner magnetic core 28 which is held in place on member 26 by an internally threaded ring 30.

Referring now to FIGURE 3, the inner core 28 is approximately cross-shaped and includes four radial arms defining poles 32, 34, 36 and 38 which extend out nearly to the outer ring core 18. The outer surfaces of the poles are concentric with core 18, and establish respective air-gaps 40, 42, 44 and 46 with this core. Mounted on the poles are respective coil bobbins 48, 50, 52 and 54. Two of these bobbins 48 and 52 carry primary windings 56 and 58 while the other two bobbins 50 and 54 carry secondary windings 60 and 62. Terminals 64 (FIGURE 1) are fastened to the frame member 20 for making electrical connections to the windings.

The primary windings 56 and 58 are connected through terminals 64 (by the usual means, not shown) to a source of alternating current, and are energized out-of-phase, i.e. flux enters pole 32 from ring core 18 during the half-cycle that flux leaves pole 36 crossing to ring core 18, and vice-versa during the next half-cycle. The flux lines developed by the primary windings travel along closed magnetic circuit paths indicated in dotted outline at 66, 68, 70 and 72 (FIGURE 3), and the phase relationship between the flux lines is shown on the drawing by arrow heads.

With the core construction shown, the flux lines of magnetic circuits 66, 68, 70 and 72 are coplanar, in the sense that these flux lines define closed loops which can be considered to lie in planes which are parallel to a common plane. Also, although the core material 18 and 28 establishing the four magnetic circuits has a finite thickness, each of these circuits can be said to have an "effective" plane, e.g. in this case a (horizontal) plane passing through the magnetic cores midway between the top and bottom thereof, thus bisecting the magnetic material. For purposes of this description and the claims appended hereto, the magnetic circuits described above are referred to as "coplanar," meaning that the effective planes of these circuits are parallel to a common plane.

With the phase relationships of the various magnetic circuits as described herein, it will be evident that magnetic circuits 66 and 72 oppose one another in passing through pole 38, and similarly magnetic circuits 68 and 70 oppose one another in pasing through pole 34. Thus, for example, when the flux produced in these magnetic circuits is equal, there will be no net flux in poles 34 and 38, and hence there will be no output voltage developed by secondary windings 60 and 62.

The magnitude of flux in magnetic circuits 66, 68, 70 and 72 is controlled by a movable cylindrical armature 74 (see particularly FIGURE 1) which is secured to the upper end of shaft 14. This armature is made of electrically-conductive material and, to provide the required flux-barrier action, is formed with circumferential (horizontal) slots 76, 78, 80 and 82 each extending nearly half-way around the armature. A series of upright plastic bracers 81 also is provided to assure adequate structural rigidity.

Slots 76 and 78 are vertically aligned, i.e. with respect to the armature axis, and are located immediately above slots 80 and 82 which also are vertically aligned. The openings defined by the upper set of slots 76 and 78 and the openings defined by the lower set of slots 80 and 82 are offset circumferentially by an angle of 90° (measured radially from the armature axis).

The physical layout of the armature slots is best shown in FIGURE 4, which is a "developed" plan view of the armature. In this view, the cylindrical surface of the armature is shown as though the armature had been cut lengthwise in one place and then laid out flat. In effect, the armature consists of three coaxial rings 83, 84 and 85 which are spaced apart vertically. The upper ring 83 is connected to the center ring 84 by legs 86, and the center ring is connected to the lower ring 85 by legs 88. The inner core poles 32, 34, 36 and 38 are shown in the background to indicate their positioning with respect to the various parts of the armature.

It will be apparent from FIGURE 4 that each of the slots 76, 78, 80 and 82 extends around, i.e. overlies, a respective pair of the poles 32, 34, 36 and 38, and thus each slot is interposed directly in the path of a corresponding one of the magnetic circuits 66, 68, 70 and 72. Since the armature 74 is made of electrically-conductive material, however, there can be no net flux passing through any of the slots. Accordingly, as will be explained, any axial movement of the armature produces a corresponding change in the magnetic reluctances of the four magnetic circuits, and thereby alters the voltages induced in the secondary windings 60 and 62.

Considering first the magnetic circuit 68, the flux in this circuit passes through the upper slot 76 both as it crosses from pole 34 to ring core 18 and as it crosses back to pole 32. Since there can be no net flux passing through this slot, it will be evident that the flux passing through the slot from pole 34 to ring core 18 must equal the flux passing through the slot from ring core 18 to pole 32. The magnitude of this flux is, of course, a function of the magnetic circuit reluctance, and this is determined essentially by the cross-sectional areas of the two air-gaps which the flux crosses. For any of the magnetic circuits, it will be evident from FIGURE 4 that the air-gap areas will be equal to the area of the pole sections that are exposed to the particular armature slot corresponding to the magnetic circuit in question. For magnetic circuit 68 the air-gap areas are represented by the areas of the upper exposed sections 32a and 34a of poles 32 and 34, that is, the sections of poles 32 and 34 above center ring 84.

The other magnetic circuits 66, 70 and 72 similarly pass through respective armature slots 82, 80 and 78, and the reluctance of each of these circuits is determined by the areas of the pole sections exposed to the corresponding slot. More in particular, the reluctance of circuit 66 is determined by the areas of pole sections 32b and 38b below the center ring 84, the reluctance of circuit 70 by the areas of pole sections 34b and 36b below the center ring, and the reluctance of circuit 72 by the areas of pole sections 36a and 38a above the center ring.

When the armature 74 is in the position shown, with the center ring 84 bisecting the air-gaps 40, 42, 44 and 46, all of the exposed pole sections 32a, 32b, etc., will have equal areas, and therefore the reluctances of magnetic circuits 66, 68, 70 and 72 will be equal. In that event, the magnetic flux in these circuits also will be equal. Consequently, there will be no net flux passing through poles 34 and 38, and no voltage will be induced in the secondary windings 60 and 62 associated with these poles.

If the armature 74 now is moved upwards, so that the area of pole sections 32a, 34a, 36a, 38a is decreased and the area of pole sections 32b, 34b, 36b, 38b is increased, there will be a corresponding change in the reluctances of the magnetic circuits 66, 68, 70 and 72. In more detail, the reluctance of circuits 68 and 72 will increase (due to the decrease in air-gap area), and the reluctance of circuits 66 and 70 will decrease (due to the increase in air-gap area). Correspondingly, the flux in circuits 68 and 72 will decrease, while the flux in circuits 66 and 70 will increase. Thus, there will be a finite value of net flux passing through poles 34 and 38, and the secondary windings 60 and 62 will develop output voltages in proportion to the magnitude of this net flux. These secondary windings are connected (by the usual means, not shown) in series-aiding relation to two of the terminals 64, thereby to provide an output voltage that is twice the magnitude of the voltage of either individual secondary.

It will be evident that if the armature 74 is moved downwardly from the "null" position shown in FIGURE 4, the magnetic circuits 66, 68, 70 and 72 again will be unbalanced, but in this case the flux in circuits 68 and 72 will increase while the flux in circuits 66 and 70 will decrease. Consequently, the output voltage developed by the secondary windings 60 and 62 will be of reverse phase relative to the output voltage developed when the armature was moved upwards.

The position measuring device described above has a very high sensitivity, in terms of the change in output voltage for a given change in armature position, and also provides a relatively large output power. And these characteristics are obtained in a device that is quite compact, e.g. the casing 10 may have a diameter of only about 1.5 inches.

One of the reasons for the high sensitivity of this device is that the center ring 84 (which corresponds to the flux-barrier "cross-piece" of the conventional device of this type) extends lengthwise through the various air-gaps, and moves in a direction that is perpendicular to the effective plane of the magnetic circuits. Since the length of the air-gaps 40, 42, 44 and 46 (as measured in a direction parallel to the effective plane of the magnetic circuits) is substantially greater than the total air-gap width (i.e. corresponding to the thickness of the core material defining these air-gaps), it will be evident that a shorter movement of the armature 74 is required for the center conductor 84 to traverse a given air-gap area than would be the case with the conventional armature arrangement wherein the flux-barrier moves lengthwise (i.e. laterally) through an air-gap. It also will be evident that the air-gap length can conveniently be made substantially greater than the air-gap width in a device of this type, wherein the magnetic circuits are positioned side-by-side and are coplanar (as defined herein), because the magnetic core thickness is small relative to the plan dimensions (i.e. the length and breadth) of the core.

In the particular form of the invention shown in FIGURE 1, the high sensitivity of the device also is augmented as a result of the fact that a single armature controls the flux distribution in a plurality of air-gaps, i.e. four. The overall instrument nevertheless is quite compact, due to the cylindrical arrangement of the armature and magnetic core structure. Additionally, such an arrangement is superior because the flux passing through the secondary winding poles 34 and 38 tends to cancel, thereby making it possible to use a relatively thin core to carry the required magnetic flux without saturation effects.

To assure that there is no rotational movement of the armature 74 during operation of the instrument, the armature is formed with a radial slot 90 into which extends a vertical locking pin 92 adapted to permit sliding axial movement of the armature. The positioning of this locking pin above the armature axis is adjustable, and for this purpose the locking pin extends through a curved slot 94 and is fastened to a knurled ring 96 which is releasably secured to the casing 10 as by set screw means 98. This adjustment arrangement is especially useful for setting the "null" or zero output point of the device, particularly by using the modified armature construction of FIGURE 5.

In this FIGURE 5 construction, the center ring of the armature consists of a series of elements 84a which slant at a slight angle with respect to a cross-sectional plane through the armature. Thus, rotation of the ring 96 (which carries with it the armature 74a) will change slightly the balance of the magnetic circuits 66, 68, 70 and 72 referred to hereinabove, because such rotation will slightly decrease the area of one of the pole sections (e.g. pole section 32a) while it correspondingly increases the area of the adjacent pole section (e.g. pole section 32b), just as though the armature had been raised or lowered a small amount. The advantage of this construction is that the amount of change in the balance of the magnetic circuits can be made quite small for a relatively large angular change in position of the armature, thereby to provide a precise adjustment of the null position of the armature.

FIGURE 6 shows another form of the invention wherein the core 100 is similar to the conventional three-legged core construction. A primary winding 102 is mounted on the center leg 104 of the core, and secondary windings 106 and 108 are mounted on the outer legs 110 and 112. The center leg is interrupted at its lower end to form an air-gap 114 within which a flux-barrier 116 is mounted for movement perpendicular to the effective plane of the core structure, i.e. towards and away from the plane of the drawing of FIGURE 6.

Figure 7:
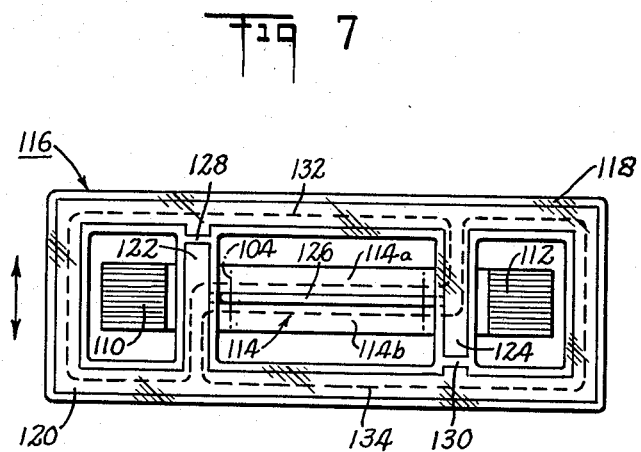
FIGURE 7 is a plan view of the flux-barrier used with the device of FIGURE 6.

As indicated more clearly in FIGURE 7, this flux-barrier 116 comprises a molded plastic member 118 encasing a rectangularly-shaped electrically-conductive armature 120 having a pair of legs 122 and 124 connected by a central cross-piece 126. The legs 122 and 124 are interrupted at opposite ends 128 and 130 to prevent electrical conduction through these points. With this arrangement, the armature defines two closed electrical loops 132 and 134 each passing through the center cross-piece 126. Circuit 132 surrounds the outer leg 110 and the section 114a of the air-gap 114 that lies above the cross-piece 126, while circuit 134 surrounds the other outer leg 112 and the section 114b of the air-gap that lies below the cross-piece.

Since there can be no net flux crossing the closed conductive loops 132 and 134, the armature 116 serves to control the relative magnitudes of flux passing through the outer legs 110 and 112. In more detail, the reluctance of the magnetic circuit passing through the center leg 104 and outer leg 110 is determined by the area of the air-gap section 114a, and similarly the reluctance of the magnetic circuit passing through the center leg and the outer leg 112 is determined by the area of the air-gap section 114b.

When the cross piece 126 is in the center of the air-gap 114 (as shown), the reluctances of these two magnetic circuits will be equal, and hence the flux passing through outer legs 110 and 112 also will be equal. With the secondary windings 106 and 108 connected in series-opposition, the position measuring device then will produce a "null" or zero output.

If the armature is moved up (inwardly, with reference to FIGURE 6), the area of air-gap section 114a will be reduced, while the area of air-gap section 114b will be increased. Consequently, the reluctance of the magnetic circuit including outer leg 110 will be increased, thereby decreasing the flux in this outer leg, while the reluctance of the magnetic circuit including outer leg 112 will be decreased, thereby increasing the flux in this outer leg. Accordingly, the voltage developed by secondary winding 106 will be reduced and the voltage developed by secondary winding 108 will be increased, so that the net output voltage developed by the device will have a finite value directly related to the change in positioning of the armature.

It should be noted that, in the FIGURE 6 embodiment, the cross-piece 126 extends lengthwise through the air-gap 114 and is movable in a direction perpendicular to the effective plane of the magnetic circuits passing through outer legs 110 and 112. Therefore the change in air-gap area encompassed by the two circuits 132 and 134 is relatively substantial for a given armature movement, as compared to the conventional arrangement wherein the flux-barrier cross-piece extends in a direction perpendicular to the effective plane of the magnetic circuits and is movable laterally through the air-gap.

Although preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Position-measuring apparatus of the type adapted to produce an alternating-current output voltage the amplitude of which varies linearly with the positioning of a movable input member, said apparatus comprising, in combination, magnetic material forming first and second magnetic circuits, said magnetic material being arranged with said magnetic circuits coplanar and positioned side-by-side, primary winding means coupled to said magnetic material to produce alternating flux through said magnetic circuits, secondary winding means coupled to said magnetic material to produce an alternating voltage corresponding to the respective magnitudes of the flux in said two magnetic circuits, said magnetc material being arranged to form air-gap means in series with both of said magnetic circuits; said air-gap means comprising at least one air-gap pole piece which in plan view is arranged in the form of a parallelogram having a pair of opposite sides which are longer than the interconnecting ends thereof, the longer sides of said parallelogram being parallel to the effective plane of said magnetic circuits and the shorter ends being transverse to said effective plane; a flux-barrier for controlling the relative distribution of flux in said magnetic circuits, said flux-barrier comprising at least one closed loop of electrically-conductive material having a elongated element of said loop positioned within said air-gap and elongated in the direction of said longer sides of said parallelogram; said elongated element being so arranged that, in the plan view of said air-gap pole-piece and said flux-barrier element, each lengthwise edge of the element intersects both of said shorter ends of said parallelogram; and means mounting said flux-barrier for movement in a direction transverse to said effective plane.

2. Position measuring apparatus comprising, in combination, magnetic material forming first and second magnetic circuits having a common portion, said magnetic material being arranged with said first and second circuits lying side-by-side and coplanar, primary winding means coupled to said magnetic material to produce flux through said first and second magnetic circuits, secondary winding means coupled to said magnetic material to produce a voltage in accordance with the difference in the magnitudes of the flux in said first and second magnetic circuits, said magnetic material being provided with air-gap means in series with both said first and second magnetic circuits, the length of said air-gap means as measured in a direction parallel to the effective plane of said magnetic circuits being greater than the width thereof as measured in a direction perpendicular to the effective plane of said magnetic circuits, a flux-barrier for controlling the relative distribution of flux in said magnetic circuits, said flux-barrier comprising a closed loop of electrically-conductive material having an elongated element of said loop positioned within said air-gap means and elongated along said length of said air-gap means, and means mounting said flux-barrier for movement in the direction of said width of said air-gap means perpendicular to said effective plane of said first and second magnetic circuits.

3. Position measuring apparatus comprising, in combination, a first core of magnetic material formed in the shape of a ring, a second core of magnetic material positioned within said first core and including a plurality of radial arms extending out towards said first core, at least one of said arms being arranged to form an air-gap between said first and second cores, primary winding means on said one arm to produce flux across said air-gap to said first core and back to said second core through at least two other of said arms on opposite sides of said one arm, secondary winding means coupled to said other arms to produce a voltage responsive to the magnitudes of the flux therein, a flux-barrier for controlling the relative distribution of flux in said other two arms, said flux-barrier comprising a closed loop of electrically-conductive material having at least one element thereof positioned within said air-gap, and means mounting said flux-barrier for movement within said air-gap to control the flux in said two other arms in accordance with the positioning thereof relative to said air-gap.

4. Position measuring apparatus comprising, in combination, a first core of magnetic material formed in the shape of a ring, a second core of magnetic material positioned within said first core and including at least three radial arms extending out towards said first core, at least one of said arms being arranged to form an air-gap at the outer end thereof and between said first and second cores, primary winding means on said one arm to produce flux across said air-gap to said first core and back to said second core through at least two other of said arms on opposite sides of said one arm, secondary winding means coupled to said two other arms to produce a voltage responsive to the magnitudes of the flux therein, a flux-barrier for controlling the relative distribution of flux in said other two arms, said flux-barrier comprising a closed loop of electrically-conductive material having at least one element thereof positioned within said air-gap and lying in a plane parallel to the effective plane of said first ring-shaped core, and means mounting said flux-barrier for movement within said air-gap in a direction transverse to said effective plane of said first core to control the flux in said other two arms in accordance with the positioning of said flux-barrier within said air-gap.

5. Position measuring apparatus comprising, in combination, a first core of magnetic material formed in the shape of a ring, a second core of magnetic material positioned within said first core and including a plurality of radial arms extending out towards said first core, said arms being arranged to form corresponding air-gaps between said first and second cores, primary winding means on alternate ones of said arms to produce flux across the corresponding air-gaps to said first core and back through the other of said arms, secondary winding means on said other arms to produce voltages responsive to the flux therein, a flux-barrier formed of electrically-conductive material and extending into said air-gaps to control the relative distribution of flux in said other arms, said flux-barrier comprising three coaxial ring-shaped elements mounted side-by-side with the center one of said elements located in the interior of said air-gaps, said flux-barrier further including a plurality of parts interconnecting said ring-shaped elements to form corresponding electrically-conductive closed loops, each of said loops encircling portions of adjacent pairs of said air-gaps, and means mounting said flux-barrier for movement within said air-gaps in a direction transverse to the effective plane of one of said ring-shaped elements, whereby to control the flux in said other arms in accordance with the positioning of said flux-barrier within said air-gaps.

6. Position measuring apparatus comprising, in combination, a first core of magnetic material formed in the shape of a ring, a second core of magnetic material positioned within said first core and including a plurality of radial arms extending out towards said first core, said arms being provided at their outer ends with air-gaps between said first and second cores, primary winding means on alternate ones of said arms to produce flux across the corresponding air-gaps to said first core and back through the other of said arms, secondary winding means on said other arms to produce voltages responsive to the flux therein, a flux-barrier positioned within said air-gaps to control the relative distribution of flux in said other arms, said flux-barrier comprising a series of electrically-conductive closed loops extending consecutively around said second core of magnetic material, each of said closed loops encircling portions of the air-gaps at the ends of a corresponding pair of said arms, and means mounting said flux-barrier for movement within said air-gap in such a direction as to vary the portions of said air-gaps that are encircled by said closed loops so as to control the flux in said other arms in accordance with the positioning of said flux-barrier relative to said air-gaps.

7. Position measuring apparatus comprising, in combination, a first core of magnetic material formed in the shape of a ring, a second core of magnetic material positioned within said first core and including four evenly-spaced radial arms extending out towards said first core, said arms being provided at their outer ends with air-gaps between said first and second cores, first and second primary windings on opposite ones of said arms respectively to produce flux across the corresponding air-gaps to said first core and back through the other two of said arms, first and second output windings on said other arms respectively to produce voltages responsive to the flux therein, a flux-barrier extending into said air-gaps to control the relative distribution of flux in said other arms, said flux-barrier comprising at least two closed loops of electrically-conductive material positioned consecutively around said second core of magnetic material and encircling portions of said air-gaps to control the relative distribution of said flux between said other arms, and means mounting said flux-barrier for movement within said air-gaps to change the area of the encircled portions of said air-gaps and thereby to vary the relative distribution of said flux between said other arms, whereby to produce a voltage in said output windings in accordance with the positioning of said flux-barrier relative to said air-gaps.

8. Position measuring apparatus comprising, in combination, a first core of magnetic material formed in the shape of a ring, a second core of magnetic material positioned within said first core and including four radial arms in the shape of a cross and extending out towards said first core, said arms being provided at their outer ends with air-gaps between said first and second cores, primary winding means on opposite ones of said arms to produce flux across the corresponding air-gaps to said first core and back through the other two of said arms, secondary winding means on said other arms to produce voltages responsive to the flux therein, flux-barrier means extending into said air-gaps to control the relative distribution of flux in said other arms, said flux-barrier means comprising a plurality of closed loops of electrically-conductive material extending around said second core of magnetic material, each of said closed loops being arranged to encircle portions of a corresponding pair of adjacent air-gaps to control the relative distribution of said flux between said other arms, and means mounting said flux-barrier means for movement within said air-gaps in a direction perpendicular to the effective plane of said ring-shaped first core to vary the relative distribution of said flux between said other arms, whereby to produce a voltage in said secondary winding means in accordance with the positioning of said flux-barrier means relative to said air-gaps.

9. Position measuring apparatus comprising, in combination, a first core of magnetic material formed in the shape of a ring, a second core of magnetic material positioned within said first core and including a plurality of radial arms extending out towards said first core, said arms being arranged at their outer ends to form corresponding air-gaps between said first and second cores, primary winding means on alternate ones of said arms to produce flux across the corresponding air-gaps to said first core and back through the other of said arms, secondary winding means on said other arms to produce voltages responsive to the flux therein, a flux-barrier positioned within said air-gaps to control the relative distribution of flux in said other arms, said flux-barrier comprising two sets of electrically-conductive closed loops, said two sets extending side-by-side around said second core of magnetic material with the closed loops of one set offset from the closed loops of the other set, each of said closed loops encircling portions of the air-gaps at the ends of a corresponding adjacent pair of said arms, and means mounting said flux-barrier for movement within said air-gap in a direction that is transverse to the effective plane of said ring-shaped first core so as to vary the portions of said air-gaps that are encircled by said closed loops, whereby to control the flux in said other arms in accordance with the positioning of said flux-barrier relative to said air-gaps.

10. In magnetically-operated apparatus for producing an electrical signal in accordance with the position of a movable member, the combination of magnetic core material forming two closed magnetic circuits having a portion thereof in common, primary winding means wound on said core material and arranged to produce flux through both of said magnetic circuits, secondary winding means wound on said core material and arranged to produce an electrical output signal in accordance with the relative distribution of said flux between said two magnetic circuits, at least two air-gaps in said magnetic core material each in series with at least a respective one of said magnetic circuits, a flux-barrier comprising a closed loop of electrically-conductive material, said flux-barrier loop having parts thereof positioned in both of said air-gaps, and means mounting said flux-barrier for movement with respect to said magnetic core material to vary the relative distribution of said flux between said two magnetic circuits.

11. In magnetically-operated apparatus for producing an electrical signal in accordance with the position of a movable member, the combination of magnetic core material forming two closed magnetic circuits having a portion thereof in common, primary winding means wound on said core material and arranged to produce flux through both of said magnetic circuits, secondary winding means wound on said core material and arranged to produce an electrical output signal in accordance with the relative distribution of said flux between said two magnetic circuits, said magnetic material being arranged to form first, second and third air-gaps, said first air-gap being in series with said common portion, said second and third air-gaps being in series respectively with said two magnetic circuits in regions thereof remote from said common portion, a flux-barrier comprising at least two closed loops of electrically-conductive material extending into said air-gaps, one of said flux-barrier loops passing through both said first and second air-gaps, the other of said loops passing through said first and third air-gaps, and means mounting said flux-barrier for movement with respect to said magnetic core material in such a direction as to vary the relative distribution of flux between said two magnetic circuits.

12. Apparatus for producing an electrical signal the amplitude of which varies in accordance with the position of a movable member, said apparatus comprising, in combination, magnetic core material forming two closed magnetic circuits having a portion thereof in common, said magnetic circuits being coplanar and positioned side-by-side, primary winding means wound on said core material and arranged to produce flux through both of said magnetic circuits, secondary winding means wound on said core material and arranged to produce an electrical output signal in accordance with the relative distribution of said flux between said two magnetic circuits, at least two air-gaps in said magnetic core material each in series with at least a respective one of said magnetic circuits, a flux-barrier comprising a closed loop of electrically-conductive material, said flux-barrier loop including portions extending respectively through both of said air-gaps and lying in planes parallel to the effective planes of said two magnetic circuits, and means mounting said flux-barrier for movement in a direction transverse to said effective planes of said magnetic circuits to vary the relative distribution of said flux between said two magnetic circuits.

13. In measuring apparatus adapted to produce an A.-C. electrical signal which varies in accordance with the position of a movable member, the combination of magnetic material forming two closed magnetic circuits having a portion thereof in common, said magnetic material being arranged with said two circuits being coplanar and positioned side-by-side, primary winding means wound on said magnetic material and arranged to produce flux through both of said two magnetic circuits, secondary winding means wound on said magnetic material and arranged to produce an electrical output signal responsive to the relative distribution of said flux between said two magnetic circuits, each of said magnetic circuits being provided with a respective air-gap in series with the corresponding one of said magnetic circuits and in regions thereof remote from said common portion, a flux-barrier for controlling the relative distribution of said flux between said two magnetic circuits and comprising a closed loop of electrically-conductive material, said flux-barrier having elongated parts thereof extending through both of said air-gaps respectively with said parts lying in planes parallel to said effective plane of said two magnetic circuits, and means mounting said flux-barrier for movement in a direction transverse to said effective plane of said two magnetic circuits so as to vary the relative distribution of flux between said two magnetic circuits in accordance with the positioning of said flux-barrier.

14. In position-sensing apparatus adapted to produce an electrical signal in accordance with the position of a movable member, the combination of magnetic core material forming two closed magnetic circuits with a portion thereof in common, said magnetic circuits being coplanar and positioned alongside one another, primary winding means wound on said core material and arranged to produce flux through both of said magnetic circuits, secondary winding means wound on said core material and arranged to produce an electrical output signal in accordance with the relative distribution of said flux between said two magnetic circuits, said magnetic material being arranged to form first, second and third air-gaps, said first air-gap being in series with said common portion, said second and third air-gaps being in series respectively with said two magnetic circuits in regions thereof remote from said common portion, a flux-barrier comprising at least two closed loops of electrically conductive material extending into said air-gaps, one of said flux-barrier loops including element passing through both said first and second air-gaps and lying in planes parallel to the effective plane of said magnetic circuits, the other of said loops including elements passing through said first and third air-gaps and lying in planes parallel to said effective plane of said magnetic circuits, and means mounting said flux-barrier for movement in a direction transverse to said effective plane of said magnetic circuits so as to vary the relative distribution of said flux between said two magnetic circuits in accordance with the positioning of said flux-barrier.

15. Position measuring apparatus comprising, in combination, a first core of magnetic material formed in the shape of a ring, a second core of magnetic material positioned within said first core and including a plurality of radial arms extending out towards said first core, said arms being arranged to form corresponding air-gaps between said first and second cores, primary winding means on alternate ones of said arms to produce flux across the corresponding air-gaps to said first core and back through the other of said arms, secondary winding means on said other arms to produce voltages responsive to the flux therein, a flux-barrier formed of electrically-conductive material and positioned within said air-gaps to control the relative distribution of flux in said other arms; said flux-barrier comprising three coaxial ring-shaped elements mounted side-by-side with the center one of said elements extending through the interior of said air-gaps, a first group of legs interconnecting said center ring-shaped element with an outer one of said elements to form a first series of electrically-conductive closed loops, a second group of legs interconnecting said center ring-shaped element with the other of said outer elements to form a second series of electrically-conductive closed loops, each of said first group of legs being positioned between adjacent pairs of said arms so that the corresponding closed loops encircle portions of the air-gaps of said adjacent pairs, each of said second group of legs being positioned between corresponding ones of said first group of legs so that said second series of closed loops is offset circumferentially with respect to said first series of closed loops, the closed loops of said second series encircling portions of the air-gaps of adjacent pairs of said arms that are offset with respect to said first-mentioned pairs of adjacent arms, and means mounting said flux-barrier for movement within said air-gap in a direction that is transverse to the effective plane of said magnetic material, whereby to control the flux in said other arms in accordance with the positioning of said flux-barrier relative to said air-gaps.

16. Position measuring apparatus comprising, in combination, a first core of magnetic material formed in the shape of a ring, a second core of magnetic material positioned within said first core and including four evenly-spaced radial arms extending out towards said first core, said arms being arranged at their outer ends to form corresponding air-gaps between said first and second cores, primary winding means on opposite ones of said arms to produce flux across the corresponding air-gaps to said first core and back through the other two of said arms, secondary winding means on said other arms to produce voltages responsive to the flux therein, a flux-barrier formed of electrically-conductive material and extending into said air-gaps to control the relative distribution of flux in said other arms, said flux-barrier comprising three coaxial ring-shaped elements mounted side-by-side with the center one of said elements located in the interior of said air-gaps, said flux-barrier further including first and second pairs of legs interconnecting said center ring-shaped element with the outer ones of said elements respectively, said first pair of legs being in diametrically opposite positions about said ring-shaped elements and between an adjacent set of said arms, said second pair of legs being in diametrically opposite positions about said ring-shaped elements and intermediate said first pair of legs, and means mounting said flux-barrier for movement within said air-gaps in a direction transverse to a plane passing through one of said ring-shaped elements, whereby to produce a voltage in said secondary winding means in accordance with the positioning of said flux-barrier relative to said air-gaps.

17. Apparatus for producing an electrical signal the amplitude of which varies in accordance with the position of a movable member, said apparatus comprising, in combination, magnetic core material forming two closed magnetic circuits having a portion thereof in common, primary winding means wound on said core material and arranged to produce flux through both of said magnetic circuits, secondary winding means wound on said core material and arranged to produce an electrical output signal in accordance with the relative distribution of said flux between said two magnetic circuits, air-gap means in said magnetic core material in series with both of said magnetic circuits, a flux-barrier for controlling the distribution of said flux between said two circuits, said flux-barrier comprising a closed loop of electrically-conductive material having at least one elongated element portion positioned within said air-gap means, means mounting and flux-barrier for free movement in a first direction that is transverse to the effective axis of said elongated element, and adjustment means for controllably moving said flux-barrier in a direction that is transverse to said first direction and slightly different from parallel to the effective axis of said elongated element to permit ready setting of the zero-output position of said flux-barrier.

18. Position measuring apparatus comprising, in combination, a first core of magnetic material formed in the shape of a ring, a second core of magnetic material positioned within said first core and including a plurality of radial arms extending out towards said first core, said arms being arranged at their outer ends of form air-gaps between said first and second cores, primary winding means on at least one of said arms to produce flux across the corresponding air-gap to said first core and back through the other of said arms, secondary winding means on said other arms to produce voltages responsive to the flux therein, a flux-barrier comprising at least one closed loop of electrically-conductive material positioned within said air-gaps to control the relative distribution of flux in said other arms, said closed loop including an elongated element extending through one of said air-gaps and lying in a plane that is tipped slightly relative to the effective plane of said ring-shaped first core of magnetic material, means mounting said flux-barrier for free movement within said air-gap in a direction that is transverse to the effective plane of said first core, and adjustment means for controllably rotating said flux-barrier about the axis of said first core to set the zero-output position of said flux-barrier.

19. In apparatus for measuring the position of a movable member, the combination comprising magnetic material arranged to establish two magnetic circuits having a portion thereof in common, primary winding means wound on said magnetic material to produce flux through both of said magnetic circuits, secondary winding means wound on said magnetic material to produce an electrical output signal responsive to the relative distribution of said flux between said two magnetic circuits, said magnetic material being provided with air-gap means in series with both of said magnetic circuits, and a flux-barrier including a closed loop of electrically-conductive material movably mounted within said air-gap means to control the relative distribution of said flux between said two magnetic circuits, said primary winding means being positioned with the longitudinal axis thereof at right angles to the longitudinal axis of said secondary winding means so as to minimize leakage coupling therebetween.

20. Position-measuring apparatus comprising, in combination, a magnetic core structure forming first and second closed magnetic circuits and having a portion common to both of said circuits, said structure including elongated top and bottom members joined at the ends thereof by a pair of outer legs, said structure also having a center leg parallel to said outer legs and extending between said top and bottom members to define said common core portion for said two magnetic circuits, said center leg being interrupted to form air-gap means, primary winding means for producing flux in said two magnetic circuits, secondary winding means inductively coupled to said first and second magnetic circuits and arranged to produce an output signal corresponding to the flux in both said circuits, and a movable flux-barrier comprising at least one closed loop of non-magnetic electrically-conductive material positioned to extend into said air-gap means for controlling the flux in said two magnetic circuits, said flux-barrier loop including a cross-piece element positioned in said air-gap means and extending parallel to said top and bottom members, said flux-barrier being movable in a direction that is transverse to the axis of said cross-piece, and plastic means encasing said flux barrier.

21. A position measuring apparatus as set forth in claim 2, further characterized by said magnetic material including elongated top and bottom members joined at the ends thereof by a pair of outer legs and by said flux-barrier including a cross-piece element positioned in said air-gap means and extending parallel to said top and bottom members, said flux-barrier being movable in a direction that is transverse to the axis of said cross-piece.

22. Apparatus as claimed in claim 21, wherein said flux-barrier comprises two closed loops of electrically-conductive material, both of said loops including said cross-piece element, one of said loops encircling one of said outer legs and a portion of said air-gap means, the other of said loops encircling one of said outer legs and a portion of said air-gap means, the other of said loops encircling the other outer leg and the remaining portion of said air-gap means.

23. Apparatus as claimed in claim 21, wherein said flux-barrier comprises a rectangularly-shaped device surrounding said magnetic core structure, the long side sections of said device extending parallel to said bottom core member on opposite sides thereof, the ends of said cross-piece being connected to said long side sections respectively.

References Cited in the file of this patent

UNITED STATES PATENTS

| | | |
|---|---|---|
| 1,644,789 | Nordenswan | Oct. 11, 1927 |
| 2,020,796 | Norris | Nov. 12, 1935 |
| 2,631,272 | Smith | Mar. 10, 1953 |
| 2,697,214 | Smith | Dec. 14, 1954 |
| 2,959,753 | Smith | Nov. 8, 1960 |
| 3,035,238 | Bouchard | May 15, 1962 |